United States Patent

Halverson et al.

[11] Patent Number: 5,579,860
[45] Date of Patent: Dec. 3, 1996

[54] THREE-POINT CAB MOUNTING SYSTEM FOR A ONE MAN CAB USING ONE REAR MOUNT

[75] Inventors: Merlin B. Halverson, Lawrence, Kans.; Raymond J. Carter, Troy, Mo.; Michael J. LeMieux, Ottawa, Kans.

[73] Assignee: Ottawa Truck, Inc., Ottawa, Kans.

[21] Appl. No.: 411,552

[22] Filed: Mar. 28, 1995

[51] Int. Cl.⁶ .......................... B62D 33/067; B62D 33/06
[52] U.S. Cl. ...................... 180/89.14; 296/35.1; 296/190; 267/141; 248/634
[58] Field of Search ............................... 180/89.12, 89.13, 180/89.14, 89.15, 89.16; 296/190, 35.1; 267/259, 141, 69; 248/620, 621, 632, 634; 280/716

[56] References Cited

U.S. PATENT DOCUMENTS

| | | | |
|---|---|---|---|
| 2,639,186 | 5/1953 | Sewelin | 296/35.1 |
| 3,279,843 | 10/1966 | Hafer et al. | 296/190 |
| 3,481,623 | 12/1969 | Campbell | 280/716 |
| 3,508,784 | 4/1970 | Small | 296/35.1 |
| 3,966,009 | 6/1976 | Meacock II et al. | 180/89.15 |
| 4,310,171 | 1/1982 | Merkle | 280/716 |
| 5,109,939 | 5/1992 | Conaway et al. | 180/89.15 |
| 5,209,316 | 5/1993 | Bauer | 180/89.14 |

FOREIGN PATENT DOCUMENTS

| | | | |
|---|---|---|---|
| 1580006 | 4/1970 | Germany | 180/89.14 |
| 4313029 | 11/1993 | Germany | 296/190 |
| 766943 | 10/1980 | U.S.S.R. | 296/190 |
| 1404399 | 6/1988 | U.S.S.R. | 296/190 |

Primary Examiner—Kevin Hurley
Assistant Examiner—Peter C. English
Attorney, Agent, or Firm—Harold E. Meier

[57] ABSTRACT

A three-point mounting system including a single rear cab mount is provided for mounting the cab to, and isolating the cab from, the frame of a tractor. Two front cab mounts and a single rear cab mount individually connected to the cab at three different points couple the cab to the frame. The location of the three different points are chosen such that a reference line drawn vertically through the center of gravity of the cab will intersect at a point within a triangular area formed by a straight line connection of the three points. The single rear cab mount comprises an improved suspension member for reducing the transmission of shocks and vibrations from the frame to the cab.

25 Claims, 8 Drawing Sheets

THREE-POINT CAB MOUNTING SYSTEM FOR A ONE MAN CAB USING ONE REAR MOUNT

TECHNICAL FIELD

The present invention relates to cab mounts for semi-tractors and, more particularly to a three-point cab mounting system for yard tractors including a single rear cab mount.

BACKGROUND OF THE INVENTION

Yard tractors typically comprise a four-point mounting system for mounting the cab to the frame of the semi-tractor. In some semi-tractors, the cab includes a deck portion whereby the cab is connected directly to the deck portion with the cab mounted to the frame. Others have the deck portion mounted to the frame with the cab riding on top of and connected to the deck portion.

A yard tractor is a semi-tractor having a short wheel base and may have distinct structural features, such as an elevating fifth wheel, for performing various specialized tasks. Typically, a yard tractor has a one-man cab configured to cover only about one-half of the tractor and is positioned either on the right hand or left hand side of the tractor, depending on the location of the tractor's country of manufacture, location of intended use and/or the user's preference. Some countries require the operator to be positioned on the right hand side while others require positioning on the left hand side. Either configuration causes a shift of the center of gravity to one side or the other of the tractor centerline depending on which side the cab is positioned. This shift in the center of gravity creates unique characteristics in the response of the cab to shocks and vibrations.

Normally, the cab of a yard tractor is separated from and placed atop of the deck, with the deck covering the entire front axle area and engine. In addition, the rear axle of a yard tractor usually has no axle-to-frame suspension due mainly to desired performance characteristics or criteria. Without some type of suspension or isolation system, shocks and vibrations generated by movement of the yard tractor over rough roads or terrain are transmitted through the frame to the cab. Traditionally, a yard tractor cab is mounted on the frame using a four-point mounting system with mounts at two front points and two rear points. Generally, the front points are located at the front corners of the two main frame rails and the rear points are located towards the rear corners of the intersection of the cab and deck with the main frame.

The problem with the present four-point cab mounting system is the transmission of unwanted shocks and vibrations into the cab due to the absence of an axle-to-frame rear suspension. Since the traditional mounting method essentially fastens the cab (and/or deck) to the tractor main frame at four points, any shocks and vibrations subjected to the main frame (including any torsional frame twisting) are transmitted into the cab. This results in extreme discomfort to the operator. Further, increased costs are incurred to provide within the cab instrumentation and mechanisms capable of withstanding such shocks, vibrations and torsional twisting. Accordingly, there is a need for a cab mounting system which takes into account the unique characteristics of a yard tractor having a one-man cab configured on either the left or right hand side of the tractor and which is capable of reducing and preventing shocks and vibrations (including torsional twisting) from being transmitted to the cab. Further, there is needed a three-point mounting system having improved performance over the traditional four-point mounting system, which reduces the number of mounts required to mount the cab to the tractor frame. Additionally, there is a need for a rear cab mount capable of providing improved isolation of the cab from the frame to reduce torsional twisting of the cab and further reduce and prevent shocks and vibrations from being transmitted into the cab.

SUMMARY OF THE INVENTION

The present invention comprises a three-point mounting system and single rear cab mount which overcomes the foregoing disadvantages associated with the prior art. The present invention also provides a method of mounting the cab to the frame of the semi-tractor.

One embodiment of the present invention provides a three-point mounting system which comprises three cab mounts selectively located to reduce transmission of shocks and vibrations from the frame of the semi-tractor to the cab. A first front mount is attached to a front portion of the cab at a first point and a second front mount is attached to the front portion of the cab at a second point. A rear mount is attached to the rear portion of the cab at a third point, the three mounts mounting the cab to the frame. The location of the three mounts are chosen such that a reference line drawn vertically through the center of gravity of the cab will intersect at a point within a triangular area formed by an imaginary straight line connection of the first point, the second point and the third point.

Another embodiment of the present invention provides a mounting system for a yard tractor for mounting the cab to the frame. The mounting system comprises a first front mount attached to a front portion of the cab at a first point and a second front mount attached to the front portion of the cab at a second point. A rear mount assembly is attached to a rear portion of the cab at a third point. The rear mount assembly mounts the rear portion of the cab to the frame and comprises a suspension member, a latching means and a frame bracket. The suspension member is coupled between the cab and the latching means. The suspension member reduces transmission of shocks and vibrations from the frame to the cab and includes an isolator element. The latching means provides a means for coupling the cab to the frame and for decoupling the cab from the frame. A frame bracket is also provided which attaches the latching means to the frame.

DESCRIPTION OF THE DRAWINGS

For a more complete understanding of the present invention and the advantages thereof, reference is now made to the following Detailed Description taken in conjunction with the accompanying Drawings.

DETAILED DESCRIPTION

Figure 1A:
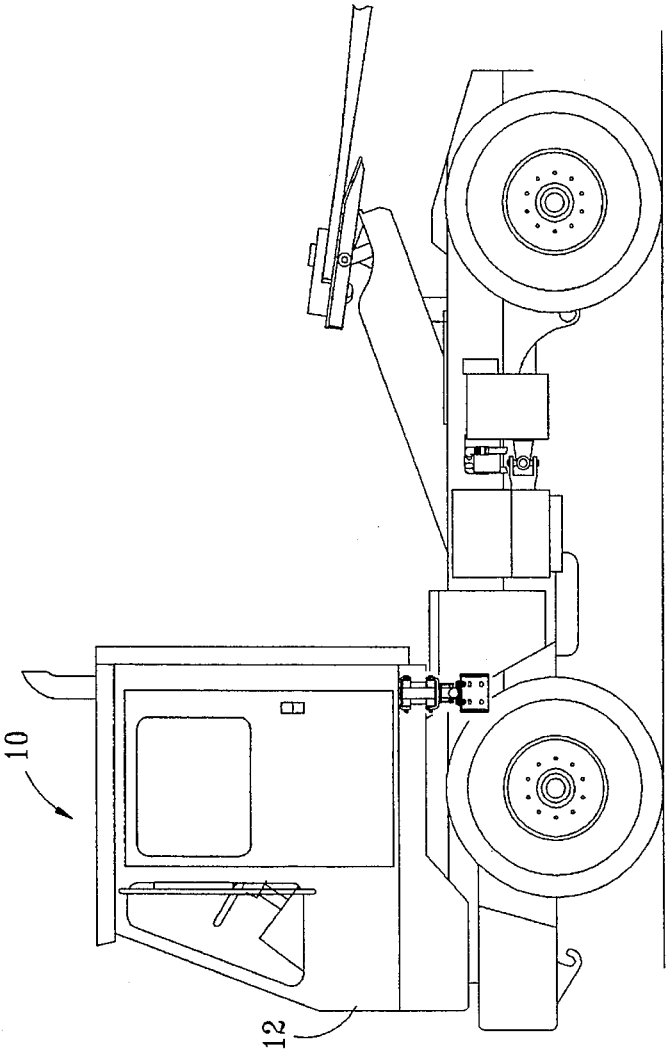
FIG. 1A is a front view of a semi-tractor with a cab.
Figure 1B:
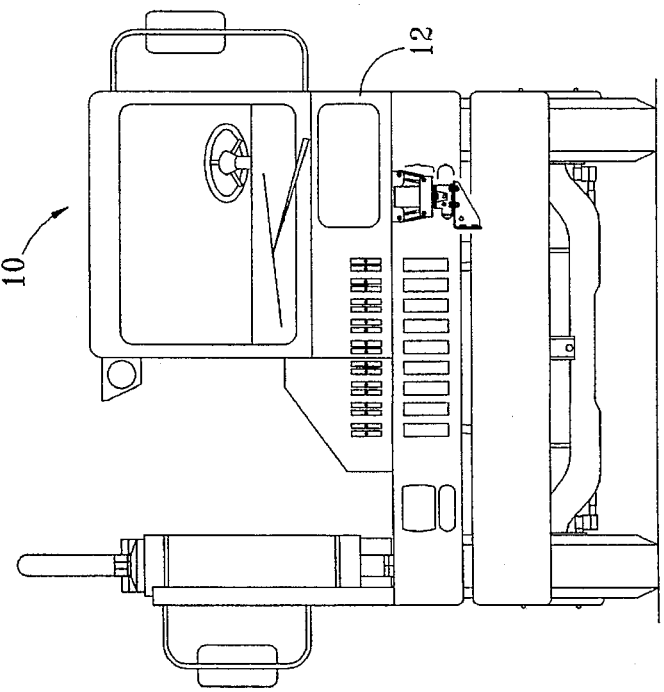
FIG. 1B is a side view of the semi-tractor shown in FIG. 1A.

Referring now to FIGS. 1A and 1B, there is illustrated a semi-tractor 10 having a cab 12. The cab 12 is shown as a one-man cab and is positioned on the semi-tractor on the right side. As will be understood, the cab 12 can also be positioned on the left side or even in the middle of the semi-tractor 10. The actual positioning and configuration of the cab 12 will most likely depend on the place of manufacture and/or the location of intended use of the semi-tractor 10.

Figure 2A:
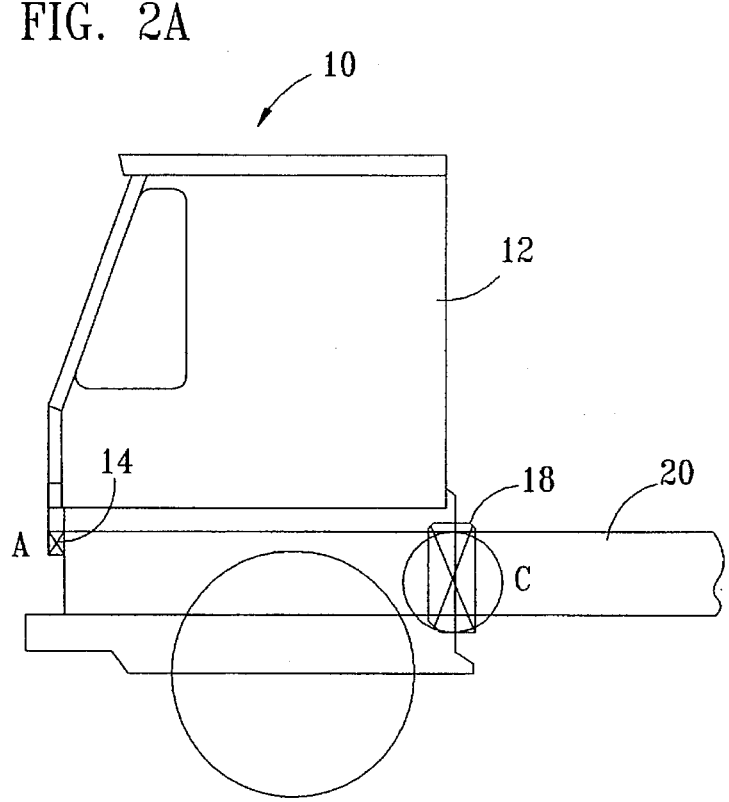
FIG. 2A is a side view of the semi-tractor and the cab illustrating a relative location of each mount of a three-point mounting system of the present invention.
Figure 2B:
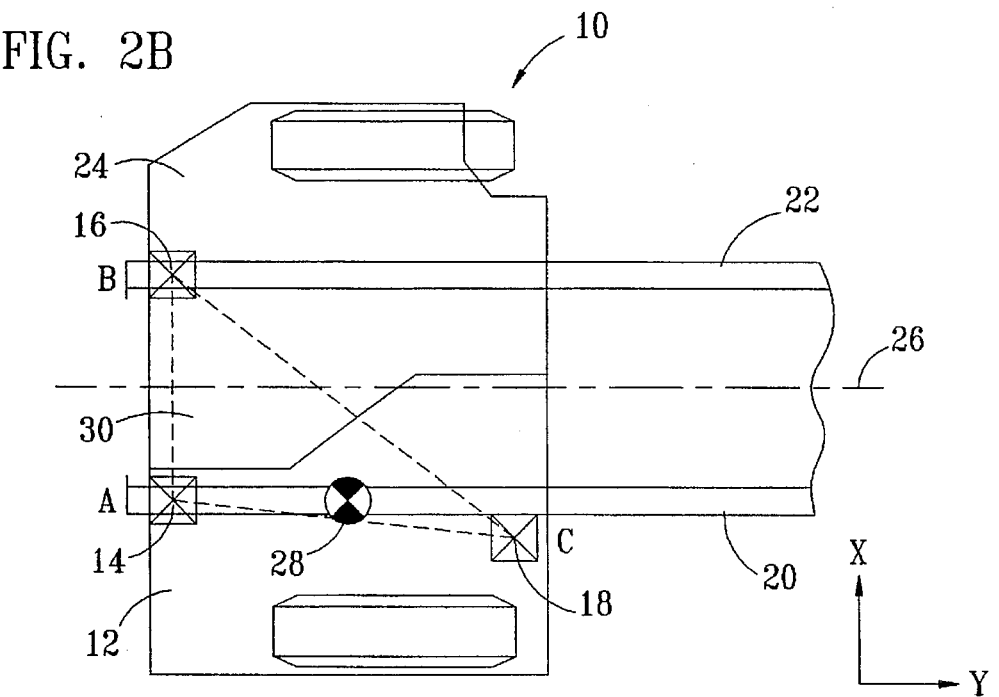
FIG. 2B is a top view of the semi-tractor and the cab further illustrating the relative location of each mount of the three-point mounting system.

With reference to FIGS. 2A and 2B, there is shown a side view and a top view, respectively, of the semi-tractor 10 illustrating a relative location for each mount of the three-point mounting system of the present invention. As shown, the semi-tractor comprises the cab 12 situated on a deck 24. The deck 24 typically covers the entire front axle and engine area of the semi-tractor 10. It will be understood that the cab 12 can be mounted directly to the deck 24 or can be separated from the deck 24. The semi-tractor further includes a first frame rail 20 and a second frame rail 22 providing the structural frame of the semi-tractor 10. A centerline 26 extends along the center line of the semi-tractor 10 as shown in FIG. 2B.

The three-point mounting system of the present invention comprises a first front cab mount 14, a second front cab mount 16 and a rear cab mount assembly 18. The first front cab mount 14 couples the front portion of the cab 12 to the front of the first frame rail 20 at a location (or point) designated as A. Similarly, the second front cab mount 16 couples the front portion of the cab 12 to the front of the second frame rail 22 at a location (or point) designated as B. For enhanced serviceability, typically the cab 12 and the deck 24 are designed to tilt forward to allow access to the engine compartment area of the semi-tractor 10. The cab 12 usually pivots about the points (location A and location B) where the cab 12 is coupled to the first and second frame rails 20 and 22. As such, the rear portion of the cab 12 moves upward as the cab 12 rotates about the first and second front cab mounts 14 and 16. The first and second front cab mounts 14 and 16 are of a type that are presently used in the well-known four-point mounting system. The first and second front cab mounts 14 and 16 generally comprise resilient rubber material incorporating a pivot pin which allows the cab 12 to be pivoted about the first and second front cab mounts 14 and 16.

The rear cab mount assembly 18 couples the rear portion of the cab 12 to either the first frame rail 20 or the second frame rail 22, depending on the positioning of the cab 12 situated either right or left. As will be appreciated, the rear cab mount assembly 18 may physically contact and connect the deck 24 or the cab 12 to one of the frame rails 20, 22. If the cab 12 is structurally mounted directly to the deck 24, the rear cab mount assembly 18 can be mounted to either the cab 12 or the deck 24 to isolate the cab 12 from the frame of the semi-tractor. Alternatively, the rear cab mount assembly may connect both the cab 12 and the deck 24 to the frame at an intersection of the cab 12 with the deck 24. If the cab 12 alone is to be isolated from the frame, the rear cab mount assembly 18 will connect directly with the rear portion of the cab 12. In the preferred embodiment, the cab 12 is connected to the deck 24 either by direct mounting at various points or by connection of the rear cab mount assembly 18 at an intersection point of the cab 12 and the deck 24. As will be understood, the three-point mounting system of the present invention can provide numerous alternative embodiments with the placement of the three mounts in different triangular configurations (i.e. such as with two mounts in the rear and one mount in the front).

In the embodiment shown in FIGS. 1A, 1B, 2A and 2B, the cab 12 is positioned on the right side of the semi-tractor 10. As such, the rear cab mount assembly 18 couples the cab 12 to the first frame rail 20 at a location (or point) designated as C. The location of point C where the cab 12 is attached to the rear cab mount assembly 18 depends on the center of gravity of the cab 12 and the deck 24 (in the x-y plane). As illustrated in FIG. 2B, the cab 12 and the deck 24 have a center of gravity 28 in the x-y plane, positioned as shown. If lines are drawn between the first front cab mount 14 (point A), the second front cab mount 16 (point B) and the rear cab mount assembly 18 (point C), a triangular planar area 30 (in the x-y plane) would be formed. The triangular planar area 30 is shown as bounded by dotted lines in FIG. 2B. As such, the point were the rear cab mount assembly 18 is attached to the cab 12 (point C) is chosen so that a reference line drawn vertically through the center of gravity 28 will intersect a point in the triangular planar area 30. It will be understood that if the cab 12 were separated from the deck 24, the location of the center of gravity would be determined solely by the physical characteristics of the cab 12. Accordingly, the center of gravity of the cab will be used to identify the center of gravity of the cab or the center of gravity of the cab and deck combination if the deck is attached to the cab. In the preferred embodiment, the location of the center of gravity 28 is determined by the physical structure of the cab 12 and the deck 24 combined.

Semi-tractors comprising a cab positioned on either the right hand or left hand side of the vehicle have a center of gravity of the cab (with or without an attached deck) which is shifted to one side or the other of the vehicle's centerline. This causes unique characteristics in the response of the cab to shocks and vibrations transmitted from the frame. To minimize these unique response characteristics of the cab, the three-point mounting system of the present invention isolates the cab from the frame. This reduces the transmission of shocks and vibrations from the frame to the cab by taking into account the location of the cab's center of gravity.

Figure 3:
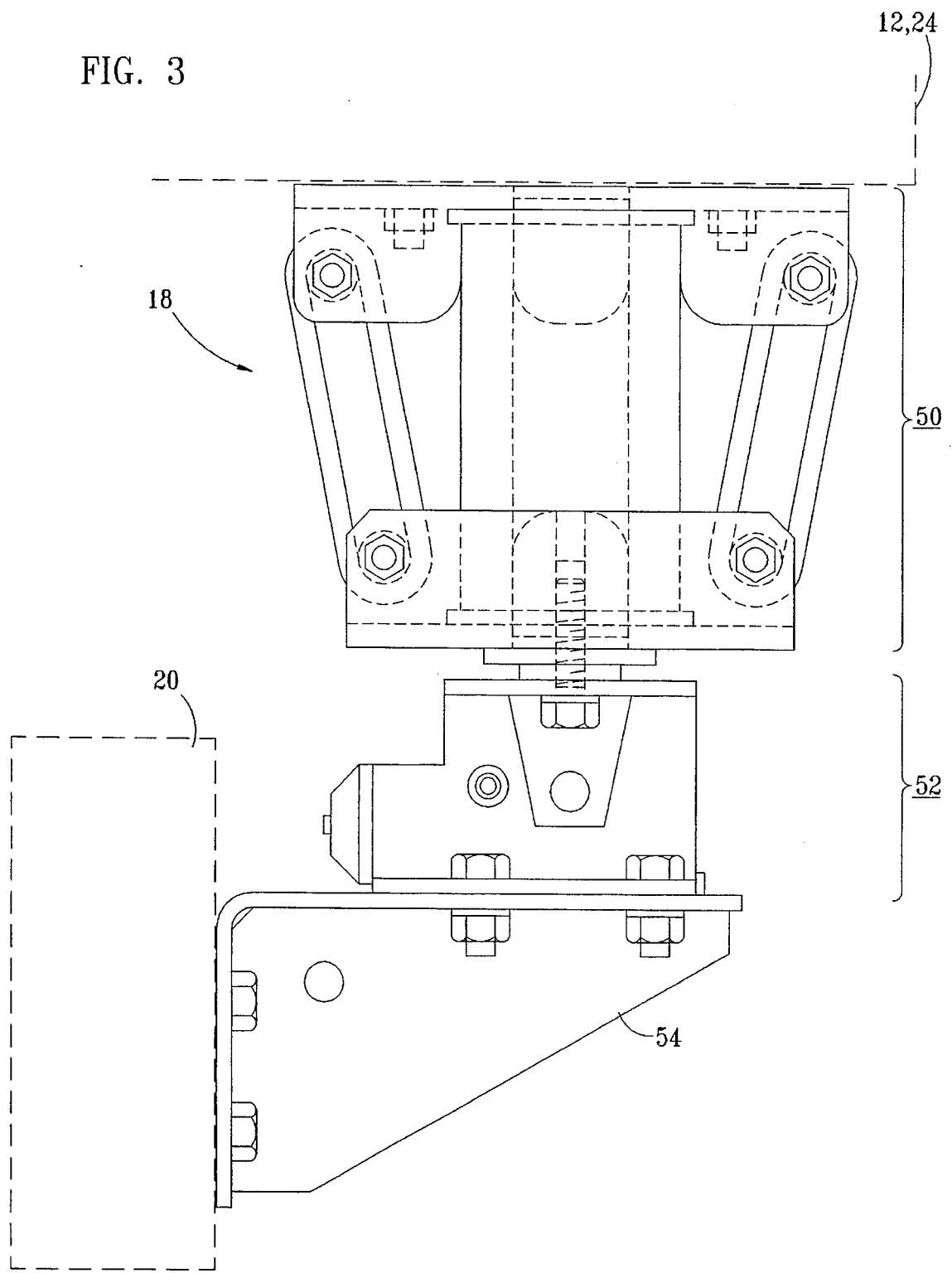
FIG. 3 is a front view illustrating a rear cab mount assembly of the present invention.

Now referring to FIG. 3, there is shown a front view of the rear cab mount assembly 18 having a rear cab mount 50, a latching mechanism 52 and a frame rail bracket 54. The rear cab mount assembly 18 is shown coupling the cab 12 to the first frame rail 20. In an alternative embodiment, the rear cab mount assembly 18 may couple both the cab 12 and the deck 24 to the first frame rail 20.

The rear cab mount 50 is attached to the cab 12 and the latching mechanism 52. The latching mechanism 52 is shown attached to the frame rail bracket 54 which is mounted to the first frame rail 20. The rear cab mount 50, sometimes referred to as a suspension member, functions as a shock and vibration absorber which reduces the transmission of shocks and vibrations to the cab 12 from the first frame rail 20. The latching mechanism 52 provides a means for coupling and decoupling the cab 12 and the first frame rail 20. The latching mechanism 52 decouples the rear cab mount 50 from the frame rail bracket 54 allowing the cab 12 to be raised and tilted forward when necessary. It will be understood that the latching mechanism 52 can be any type of latch or structure which performs the desired function. Further, the latching mechanism 52 can be either manually or automatically operated, such as by hydraulic pressure. The frame rail bracket 54 provides an attachment means between the first frame rail 20 and the latching mechanism 52.

Figure 4A:
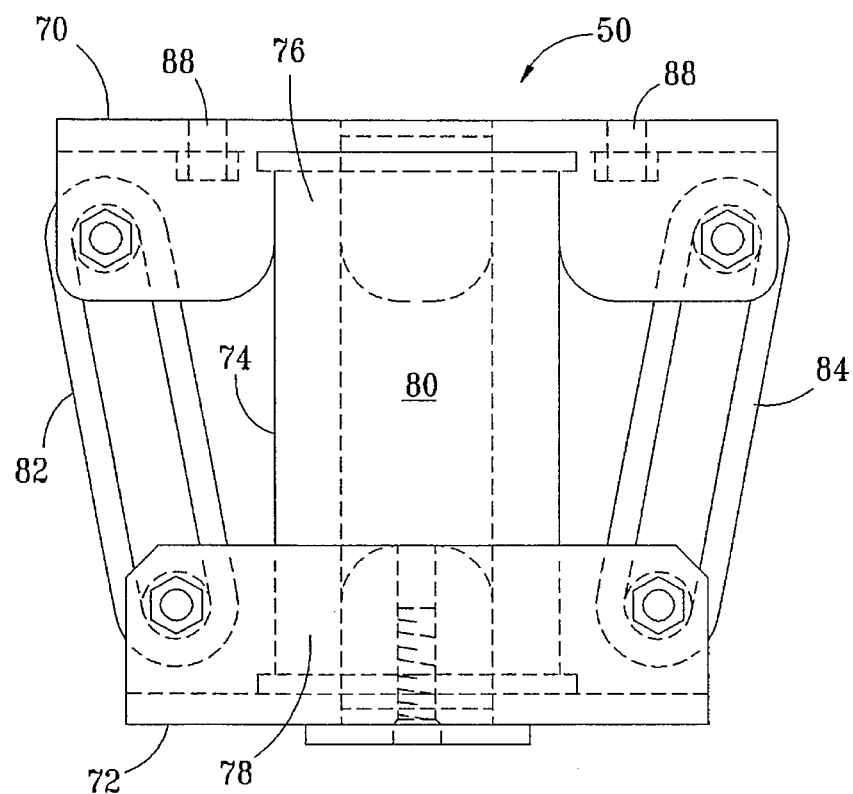
FIG. 4A is a detailed front view of a rear cab mount of the rear cab mount assembly.
Figure 4B:
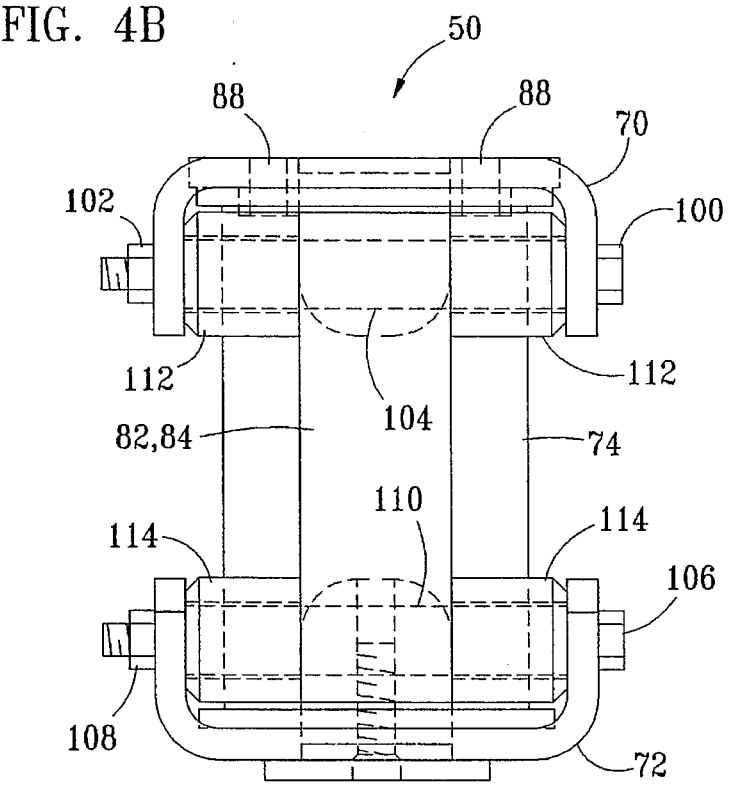
FIG. 4B is a side view of the rear cab mount shown in FIG. 4A.

Now referring to FIGS. 4A and 4B, there is shown a detailed front and side view, respectively, of the rear cab mount 50 of the rear cab mount assembly 18. The rear cab mount 50 includes a generally U-shaped upper bracket 70 and a generally U-shaped lower bracket 72. The upper bracket 70 includes a plurality of apertures 88 for attaching or connecting the upper bracket 70 of the rear cab mount 50 to the cab 12. Positioned between the upper and lower brackets 70, 72 is an isolator element 74. The isolator element 74 has a first end 76 contacting the upper bracket 70 and a second end 78 contacting the lower bracket 72. The isolator element 74 generally comprises a stiff and resilient material capable of absorbing and/or attenuating shocks and vibrations. Any type of material may be chosen which performs the desired function. In the preferred embodiment, the isolator element 74 comprises rubber and is in the shape of a hollow rubber cylinder defining an aperture 80 therethrough. Such an isolator element is commonly referred to as a marshmallow isolator.

The rear cab mount 50 further includes a first elastic strap 82 and a second elastic strap 84 for coupling the upper bracket 70 to the lower bracket 72. The first and second straps 82, 84 are generally oblong and have a shape similar to a rubber band. The first and second straps 82, 84 provide rebound control as the cab moves relative to the frame. Preferably, the first and second straps 82, 84 are made of reinforced fiber rubber material. In an alternative embodiment, the straps 82, 84 may not be required if the isolator element 74 couples the upper bracket 70 to the lower bracket 72. In such a configuration, the first and second ends 76, 78 of the isolator element 74 are rigidly attached to the upper and lower brackets 70, 72. However, in the preferred embodiment the rear cab mount 50 is constructed with the first and second straps 82, 84. Another embodiment may include both the first and second straps 82, 84 and also include the isolator element 74 rigidly attached to one or both of the upper and lower brackets 70, 72.

Figure 5A:
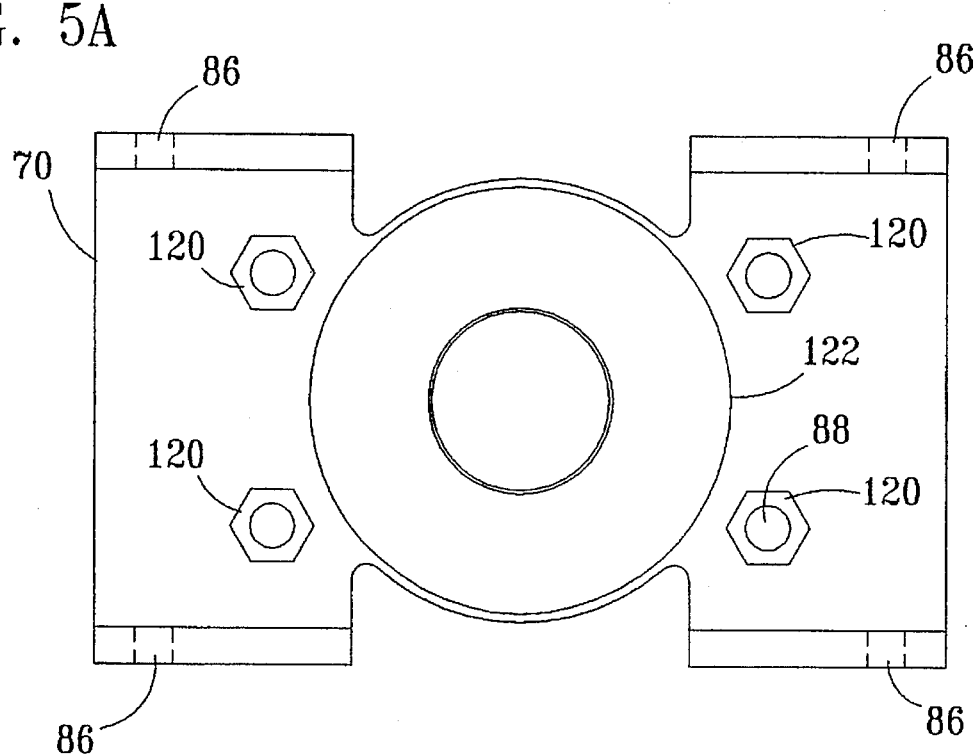
FIG. 5A is a bottom view of an upper bracket of the rear cab mount.
Figure 5B:
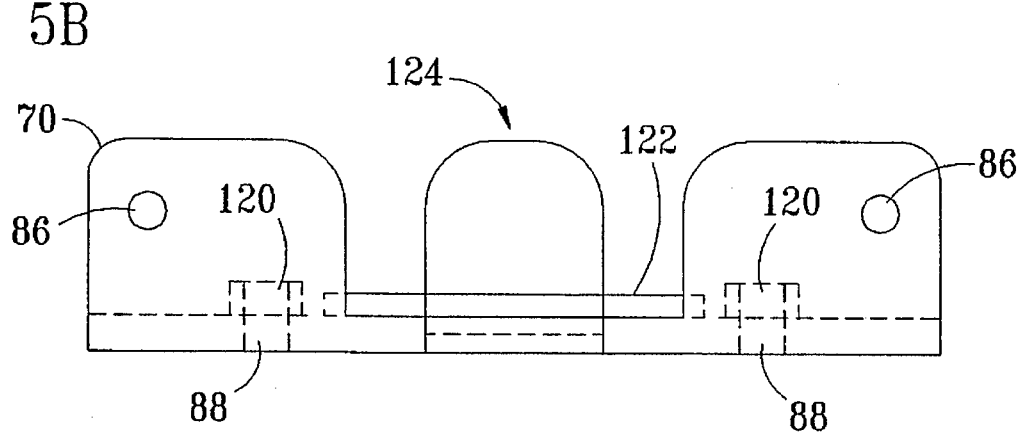
FIG. 5B is a side view of the upper bracket shown in FIG. 5A.

Referring now to FIGS. 5A and 5B, there is illustrated a top view and a side view, respectively, of the upper bracket 70. The plurality of apertures 88 for attaching the upper bracket 70 to the cab 12 each include a weldnut 120 for receiving a bolt or screw from the cab 12. In the preferred embodiment, the upper bracket 70 has a plurality of apertures 86 to provide a means for coupling the upper bracket 70 to the lower bracket 72 via straps 82, 84. Further, a circular spacer 122 is provided as a buffer between the first end 76 of the isolator element 74 and the upper bracket 70. The isolator element 74 is aligned centrally with the upper bracket 70 by use of an alignment pin 124 which is received by the aperture 80 of the isolator element 74.

Now referring to FIG. 4B, upper screw 100 extends through two apertures 86 of the upper bracket 70 and is secured to the upper bracket 70 by a nut 102. The portion of the screw 100 extending between the apertures 86 is encompassed by a roller tube 104. Positioned around the roller tube 104 is the first strap 82. The roller tube 104 buffers the contact between the straps 82, 84 and the screws 100. The screw 100 and the roller tube 104 function to couple the first strap 82 to the upper bracket 70. In the preferred embodiment, the upper bracket 70 includes another screw 100, another nut 102 and another roller tube 104 for coupling the second strap 84 to the upper bracket 70. The first and second straps 82, 84 are positioned centrally between the ends of the upper bracket 70, as shown in FIG. 4B, by utilizing ring spacers 112.

Figure 6A:
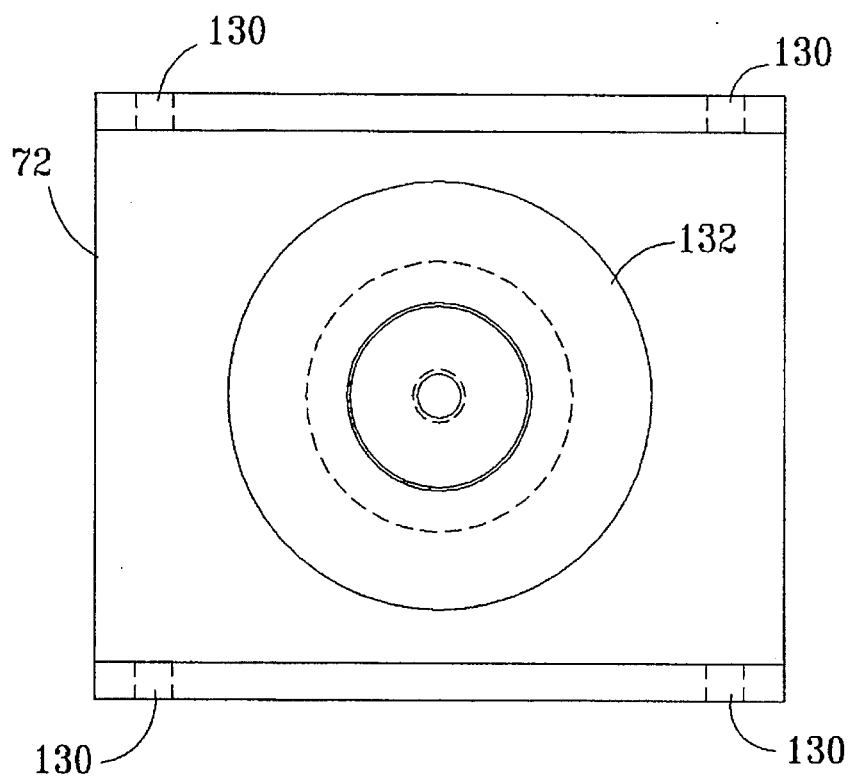
FIG. 6A is a top view of a lower bracket of the rear cab mount.
Figure 6B:
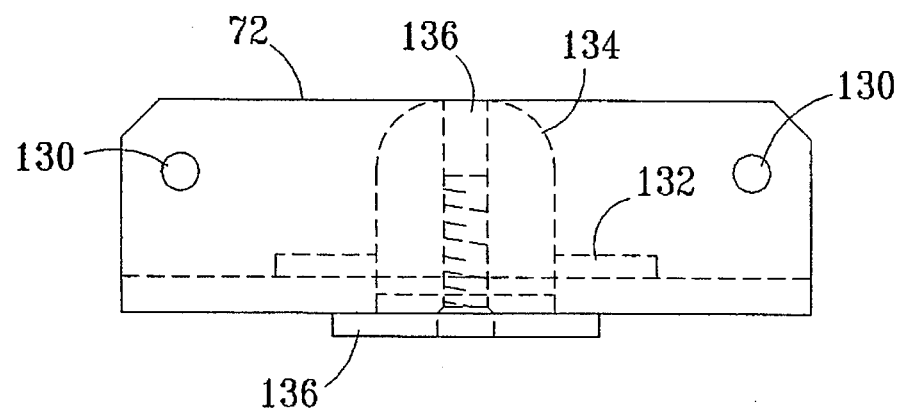
FIG. 6B is a side view of the lower bracket shown in FIG. 6A.

Referring now to FIGS. 6A and 6B, there is illustrated a top view and a side view, respectively, of the lower bracket 72. The lower bracket 72 includes a plurality of apertures 130 for coupling the lower bracket 72 to the upper bracket 70 via straps 82, 84. A circular spacer 132 is provided as a buffer between the second end 78 of the isolator element 74 and the lower bracket 72. The isolator element 74 is aligned centrally with the lower bracket 72 by use of an alignment pin 134 receiving the aperture 80 of the isolator element 74. The alignment pin 134 defines an aperture 136 for receiving a bolt or screw to couple the lower bracket 72 to the latching mechanism 52 or directly to the frame (if a latching mechanism is not used). Another circular spacer 136 is provided on the bottom of the lower bracket 72 to provide buffering to either the latching mechanism 52 or the frame (if a latching mechanism is not used). As will be appreciated, many different structures may be utilized to couple the lower bracket 72 to the latching mechanism 52 or the frame.

Similarly, the lower bracket 72 includes a plurality of apertures 130 whereby a screw 106 extends therethrough and is secured by the nut 108. A roller tube 110 encompasses the portion of the screw 106 extending between the two apertures 130. The first strap 82 is positioned around the roller tube 110 and couples the first strap 82 to the lower bracket 72. The roller tube 110 buffers the contact between the straps 82, 84 and the screws 106. In the preferred embodiment, another screw 106 (and nut 108 and roller tube 110) couples the second strap 84 to the lower bracket 72. The first and second straps 82, 84 are then centrally positioned between the ends of the lower bracket 72 by ring spacers 114.

Figure 7A:
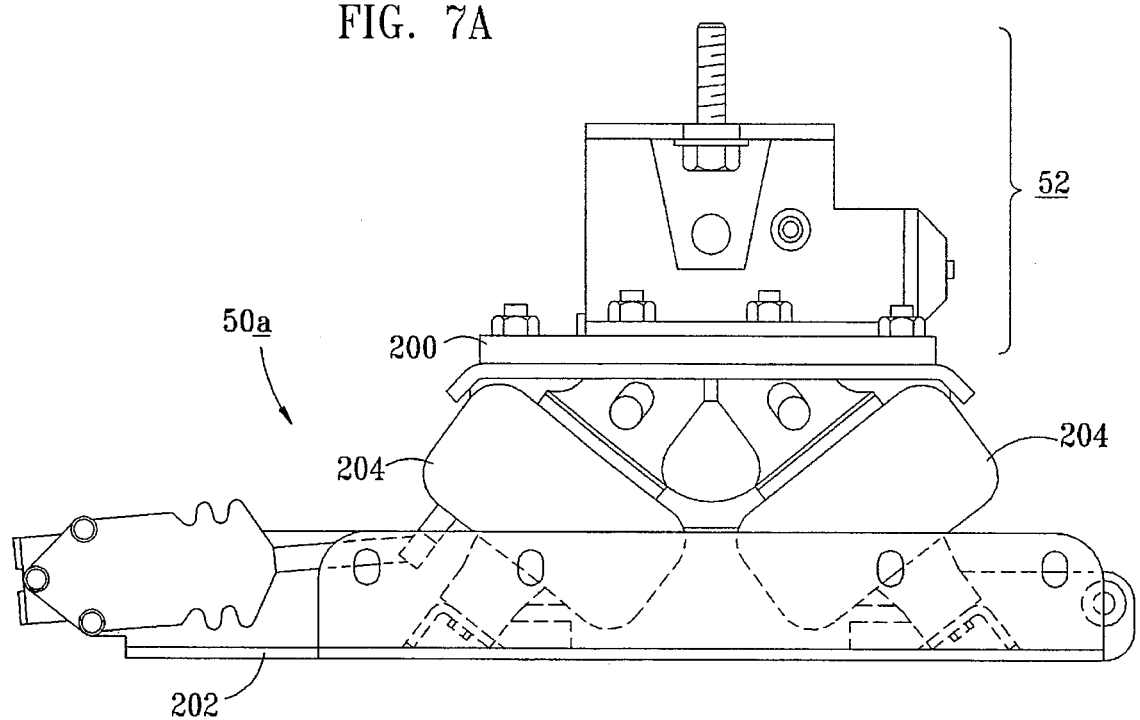
FIG. 7A is a front view of an alternative embodiment of the rear cab mount.
Figure 7B:
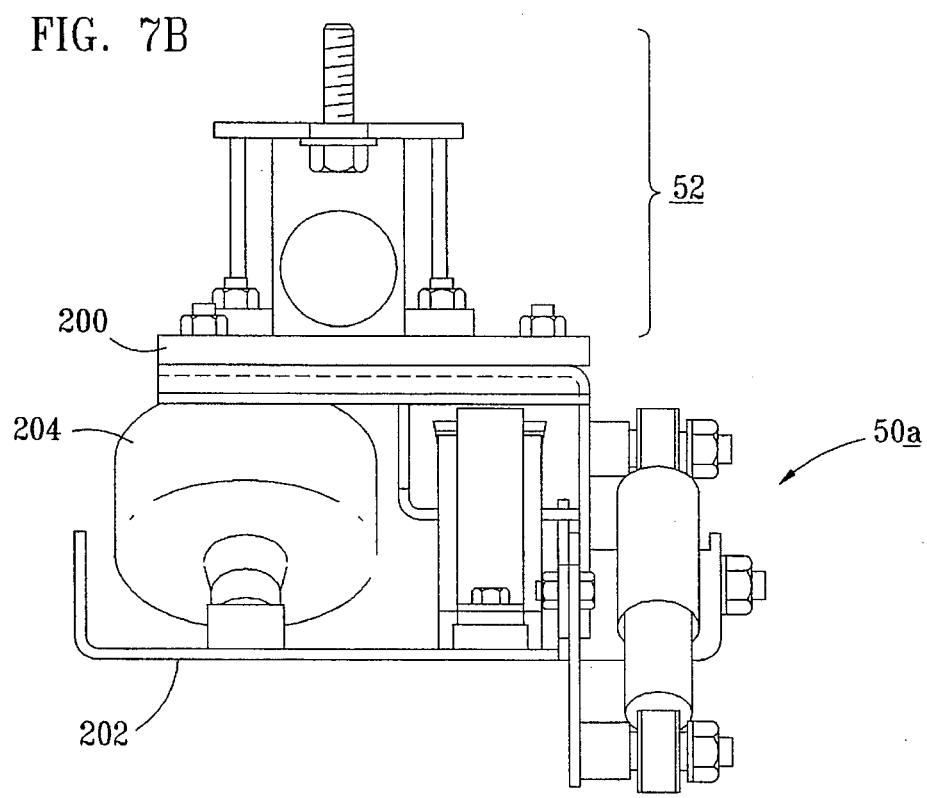
FIG. 7B is a side view of the rear cab mount shown in FIG. 7A.
Figure 7C:
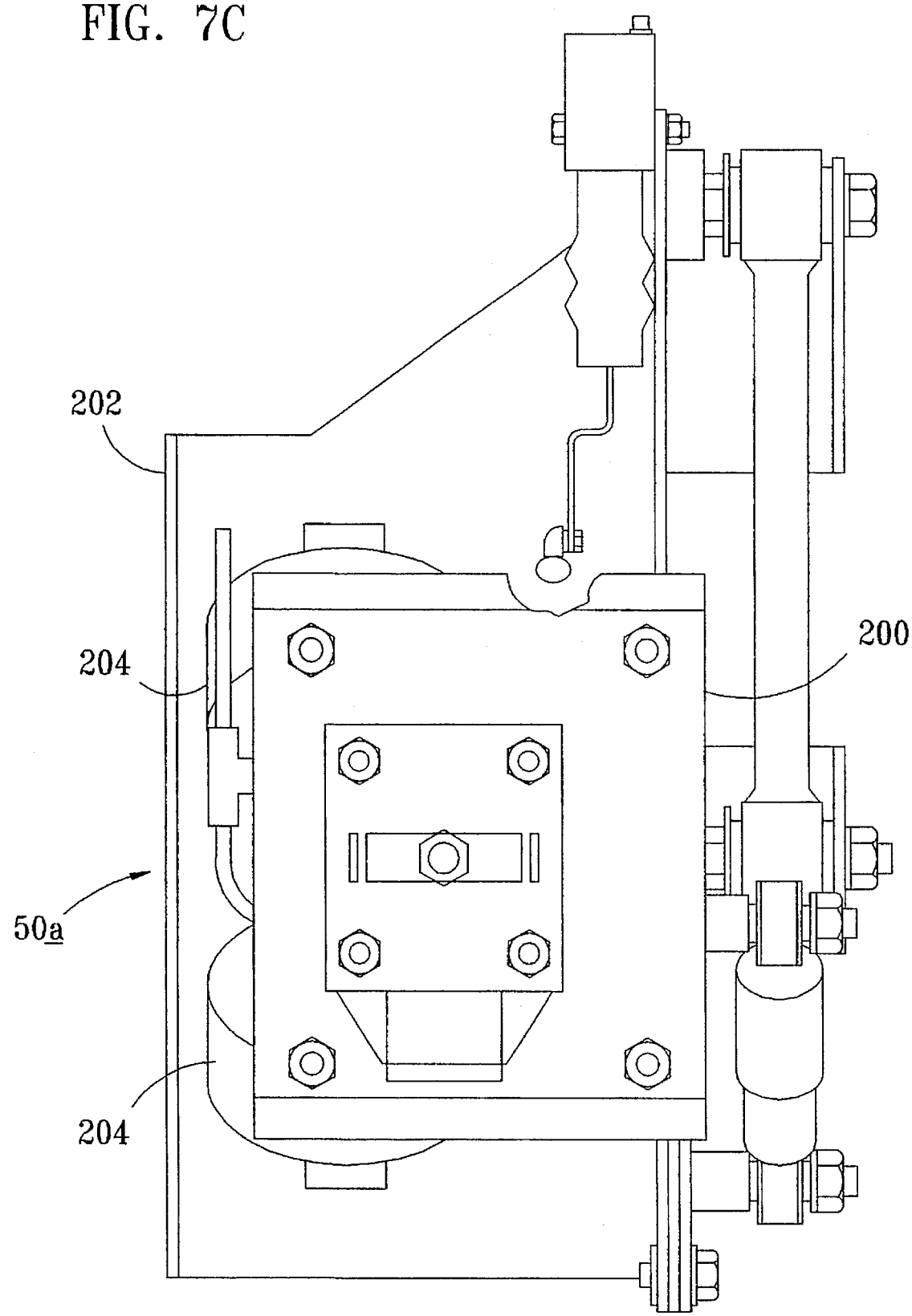
FIG. 7C is a top view of the rear cab mount shown in FIG. 7A.

In an alternative embodiment, there is shown in FIGS. 7A, 7B and 7C a rear cab mount 50a. The rear cab mount 50a functions similarly to the rear cab mount 50 but uses air or an air bag as the isolator element. FIGS. 7A, 7B and 7C illustrate the front, side and top views, respectively, of the rear cab mount 50a. The rear cab mount 50a is shown attached to the latching mechanism 52. As will be understood, the cab mount 50a can be attached to the latching mechanism 52 in many different ways and configurations. The rear cab mount 50a comprises a first bracket 200, a second bracket 202 and an isolator element 204 positioned between the first bracket 200 and the second bracket 202. The isolator element 204 typically is comprised of an air bag and functions to reduce the transmission of shocks and vibrations from the frame to the cab. The rear cab mount 50a is of a type which can be obtained from at least one manufacturer, and possibly other manufacturers. Possible devices which perform the desired function are available from Power Packer of Westfield, Wis.

The rear cab mount 50, 50a isolates the cab from the semi-tractor's frame and allows movement of the cab relative to the frame. This reduces shocks and vibrations from being transmitted to the cab. The rear cab mount 50, 50a generally provides a suspension member which is strong, yet flexible, for mounting the rear portion of the cab to the semi-tractor's frame.

Although several embodiments of the present invention have been described in the foregoing detailed description and illustrated in the accompanying drawings, it will be understood by those skilled in the art that the invention is not limited to the embodiments disclosed, but is capable of numerous rearrangements, substitutions and modifications without departing from the spirit of the invention.

What is claimed is:

1. In a vehicle having a side mounted cab and a frame, a three-point mounting system for mounting the cab to the frame laterally displaced from a centerline of the frame, the three-point mounting system comprising:

a first mount attached to the cab at a first point for mounting the cab to the frame;

a second mount attached to the cab at a second point for mounting the cab to the frame; and a single suspension mount attached to the cab at a third point, said third point laterally displaced with respect to the centerline of the frame, said centerline intersecting a line extending between the first and the second points, said suspension mount located such that an imaginary straight line connection of the first point, the second point and the third point forms a triangular area, with the first point, the second point and the third point located such that a reference line drawn vertically through the center of gravity of the cab will intersect said triangular area at a position laterally displaced from the centerline of the frame, said third point displaced from the centerline in the same direction as the center of gravity of the cab.

2. A mounting system in accordance with claim 1 wherein the frame includes frame rails and the single suspension mount is attached to a rear portion of the cab and to a frame rail.

3. A mounting system in accordance with claim 1 wherein the single suspension mount comprises:

a first bracket coupled to a rear portion of the cab;

a second bracket coupled to the frame;

means for coupling the first bracket to the second bracket; and an isolator element positioned between the first bracket and the second bracket, said isolator element comprising material for absorbing shocks and vibrations to minimize transmission of shocks and vibrations to the cab from the frame.

4. A mounting system in accordance with claim 3 wherein the means for coupling includes means for attaching the isolator element to the first bracket and the second bracket.

5. A mounting system in accordance with claim 3 wherein the isolator element comprises a marshmallow isolator made substantially from rubber and the means for coupling substantially comprise reinforced rubber.

6. A mounting system in accordance with claim 3 wherein the isolator element comprises a marshmallow isolator made substantially from rubber.

7. A mounting system in accordance with claim 3 wherein the isolator element comprises an air bag.

8. A mounting system in accordance with claim 1 wherein the single suspension mount comprises:

a first bracket attached to the cab;

an isolator element having a first end and a second end, said first end in contact with the first bracket, said isolator element comprising material for absorbing shocks and vibrations to minimize transmission of shocks and vibrations to the cab from the frame;

a second bracket in contact with the second end of the isolator element;

latching means attached to the second bracket for coupling and decoupling the cab to the frame to allow the cab to tilt; and a third bracket for attaching the latching means to the frame.

9. A mounting system for mounting a side mounted cab to a tractor, the cab mounted laterally displaced from a center line of a frame of the tractor, the mounting system comprising:

a first front mount for attaching a front portion of the cab at a first point to the frame;

a second front mount for attaching the front portion of the cab at a second point to the frame; and a single rear suspension mount assembly for attaching a rear portion of the cab at a third point laterally displaced with respect to a centerline of the frame, said centerline intersecting a line extending between the first and the second points, said single rear mount assembly comprising, a first bracket attached to the rear portion of the cab, latching means for coupling and decoupling the single rear mount assembly to the frame, a second bracket attached to said latching means, an isolator element positioned between the first bracket and the second bracket, said isolator element comprising material for absorbing shocks and vibrations to minimize transmission of shocks and vibrations to the cab from the frame, and means for coupling the first bracket to the second bracket.

10. The mounting system in accordance with claim 9, wherein the first point, the second point and the third point are located such that a reference line drawn vertically through the center of gravity of the cab intersects a triangular area formed by a straight line connection of the first point, the second point and the third point at a position laterally displaced from the centerline of the frame, said third point displaced from the centerline in the same direction as the center of gravity of the cab.

11. A mounting system in accordance with claim 9 wherein the means for coupling includes means for attaching the first bracket to a first end of the isolator element and the second bracket to a second end of the isolator element.

12. A mounting system in accordance with claim 9 wherein the isolator element comprises a cylindrical marshmallow isolator made substantially from rubber.

13. A suspension member for coupling a cab to a frame of a semi-tractor, said suspension member comprising:

a first bracket attached to a portion of the cab;

a second bracket attached to the frame;

an isolator element positioned between the first bracket and the second bracket, said isolator element minimizing transmission of shocks and vibrations from the frame to the cab; and a plurality of elastic rebound straps coupling the first bracket to the second bracket and providing rebound control as the cab moves relative to the frame.

14. A suspension member in accordance with claim 13 wherein the isolator element comprises a cylindrical marshmallow isolator made substantially from rubber.

15. A mounting system for mounting a cab of a tractor to a frame of the tractor, the mounting system comprising:

a first mount for attaching a first portion of the cab at a first point to the frame;

a second mount for attaching the first portion of the cab at a second point to the frame; and a mount assembly for attaching a second portion of the cab at a single third point laterally displaced with respect to a center line of the frame, said centerline intersecting a line extending between the first and the second points, the first point, the second point and said single third point located such that a reference line drawn vertically through the center of gravity of the cab intersects a triangular area formed by a straight line connection of the first point, the second point and said single third point, the center of gravity laterally displaced from the centerline of the frame.

16. The mounting system in accordance with claim 15 wherein the mount assembly further comprises a suspension member.

17. The mounting system in accordance with claim 16 wherein the mount assembly further comprises a means for attaching the suspension member to the second portion of the cab and to the frame.

18. The mounting system in accordance with claim 17 wherein the suspension member comprises:

a first bracket attached to the second portion of the cab;

a second bracket attached to the frame; and an isolator element positioned between the first bracket and the second bracket, said isolator element comprising material for absorbing shocks and vibrations to minimize transmission of shocks and vibrations to the cab from the frame.

19. The mounting system in accordance with claim 18 wherein the isolator element comprises a cylindrical marshmallow isolator made substantially from rubber.

20. The mounting system in accordance with claim 18 wherein the isolator element comprises an air bag for providing an air suspension.

21. The mounting system in accordance with claim 18 wherein the mount assembly further comprises latching means for coupling and decoupling the cab to the frame.

22. In a vehicle having a cab and a frame, a three-point mounting system for mounting the cab to the frame, the three-point mounting system comprising:

a first mourn attached to a portion of the cab at a first point for mounting the cab to the frame;

a second mount attached to a portion of the cab at a second point for mounting the cab to the frame; and a third rear mount attached to a rear portion of the cab at a third point for mounting the cab to the frame whereby an imaginary straight line connection of the first point, the second point and the third point forms a triangular area, with the first point, the second point and the third point located such that a reference line drawn vertically through the center of gravity of the cab will intersect said triangular area, the third rear mount having a first bracket coupled to the rear portion of the cab, a second bracket coupled to the frame, means for coupling the first bracket to the second bracket having a plurality of straps, said straps comprising an elastic material for providing rebound control as the cab moves relative to the frame and an isolator element positioned between the first bracket and the second bracket, said isolator element comprising material for absorbing shocks and vibrations to minimize transmission of shocks and vibrations to the cab from the frame.

23. In a vehicle having a cab and a frame, a three-point mounting system for mounting the cab to the frame, the three-point mounting system comprising:

a first mount attached to a portion of the cab at a first point for mounting the cab to the frame;

a second mount attached to a portion of the cab at a second point for mounting the cab to the frame; and a third mount attached to a portion of the cab at a third point for coupling the cab to the frame whereby an imaginary straight line connection of the first point, the second point and the third point forms a triangular area, with the first point, the second point and the third point located such that a reference line drawn vertically through the center of gravity of the cab will intersect said triangular area, the third mount having a first bracket attached to the cab, an isolator element having a first end and a second end, said first end in contact with the first bracket, said isolator element comprising material for absorbing shocks and vibrations to minimize transmission of shocks and vibrations to the cab from the frame, a second bracket in contact with the second end of the isolator element, a plurality of straps for coupling the first bracket to the second bracket, said straps comprising material for providing rebound control as the cab moves relative the frame, latching means attached to the second bracket for coupling and decoupling the cab to the frame to allow the cab to tilt, and a third bracket for attaching the latching means to the frame.

24. A mounting system for mounting a cab of a tractor to a frame of the tractor, the mounting system comprising:

a first front mount for attaching a front portion of the cab at a first point to the frame;

a second front mount for attaching the front portion of the cab at a second point to the frame; and a rear mount assembly for attaching a rear portion of the cab at a third point to the frame whereby, the first point, the second point and the third point are located such that a reference line drawn vertically through the center of gravity of the cab intersects a triangular area formed by a straight line connection of the first point, the second point and the third point, said rear mount assembly having, a first bracket attached to the rear portion of the cab, latching means for coupling and decoupling the rear mount assembly to the frame, a second bracket attached to said latching means, an isolator element positioned between the first bracket and the second bracket, said isolator element comprising material for absorbing shocks and vibrations to minimize transmission of shocks and vibrations to the cab from the frame, and a plurality of straps coupling the first bracket and the second bracket, said straps comprising an elastic material for providing rebound control as the cab moves relative to the frame.

25. A suspension member for coupling a cab to a frame of a semi-tractor, said suspension member comprising:

a first bracket attached to a portion of the cab;

a second bracket attached to the frame;

a cylindrical marshmallow isolator element made substantially from rubber positioned between the first bracket and the second bracket, said cylindrical marshmallow isolator element minimizing transmission of shocks and vibrations from the frame to the cab; and a plurality of straps coupling the first bracket to the second bracket and providing rebound control as the cab moves relative to the frame, said plurality of straps substantially comprise a fiber reinforced rubber.

* * * * *

UNITED STATES PATENT AND TRADEMARK OFFICE
CERTIFICATE OF CORRECTION

PATENT NO. : 5,579,860
DATED : December 3, 1996
INVENTOR(S) : Merlin B. Halverson, et al.

It is certified that error appears in the above-indentified patent and that said Letters Patent is hereby corrected as shown below:

Column 9, line 54, "mourn" should be --mount--.

Signed and Sealed this

Eleventh Day of March, 1997

Attest:

BRUCE LEHMAN

*Attesting Officer*  *Commissioner of Patents and Trademarks*